United States Patent [19]

Peroux et al.

[11] Patent Number: 4,510,965
[45] Date of Patent: Apr. 16, 1985

[54] ELASTOMER COATED BUTTERFLY VALVE BODY

[75] Inventors: Bernard Peroux, Toul; Jean Santy, Pont-a-Mousson; Jean Sutter, Villers les Nancy, all of France

[73] Assignee: Pont-A-Mousson S.A., Nancy, France

[21] Appl. No.: 361,634

[22] Filed: Mar. 25, 1982

[30] Foreign Application Priority Data

Apr. 27, 1981 [FR] France .................. 81 08513

[51] Int. Cl.³ .............................................. F16K 1/22
[52] U.S. Cl. ..................................... 137/375; 251/305
[58] Field of Search ......................... 137/375; 251/305

[56] References Cited

U.S. PATENT DOCUMENTS 3,778,028 12/1973 Graves et al. ................... 137/375
3,904,173 9/1975 Naylor .............................. 137/375
4,259,980 4/1981 Muller ............................. 251/214

Primary Examiner—A. Michael Chambers
Attorney, Agent, or Firm—Sughrue, Mion, Zinn, Macpeak and Seas

[57] ABSTRACT

The annular cast body 1 of a butterfly valve is coated both internally and externally, including the butterfly shaft and axle passages 12, 13, with an elastomeric material 2 of the same type and hardness at all points of the valve body. The coating has a thickened band 15 which acts as a seat for the butterfly, and is molded around the valve body rather than being glued.

3 Claims, 7 Drawing Figures

FIG.1
FIG.2
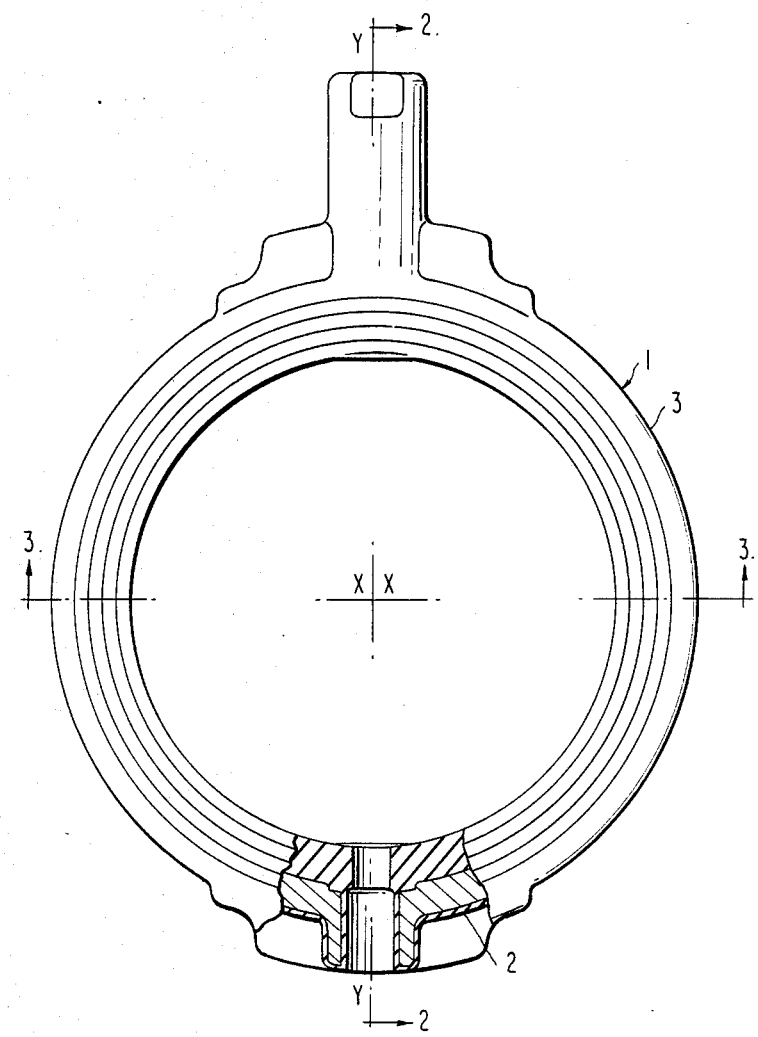
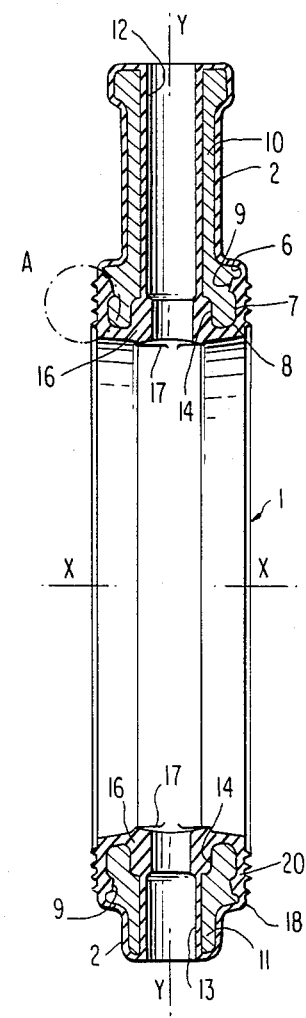
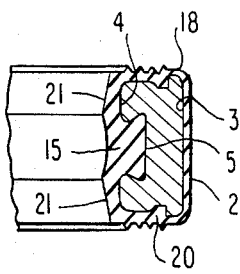
FIG.3
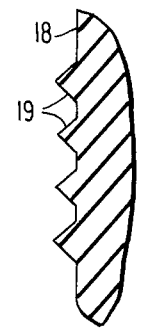
FIG.4

ELASTOMER COATED BUTTERFLY VALVE BODY

BACKGROUND OF THE INVENTION

This invention relates to an annular butterfly valve body completely coated with a single elastomeric material.

Butterfly valves are known whose bodies are coated with elastomers, but in general the elastomers coating the interior and exterior of the body are of different hardnesses or of distinct characteristics. Moreover, the attaching of the elastomer coating onto the body is carried out either by means of anchor holes traversing the valve body or by gluing, the latter necessitating a thorough preparation of the surface of the body and limiting the choice of the elastomers used. Further, the passages for the shafts or axles of the butterfly through the body are not coated with elastomer, and therefore have to be precisely machined to allow the accurate placing of sealing gaskets and bearings.

SUMMARY OF THE INVENTION

The object of the invention is to provide an economically manufactured butterfly valve whose body is completely and directly coated both internally and externally with the same continuous elastomeric (rubber-like) material, without the interposition of a bonding material, and which has the same characteristics and hardness at all points of the valve body.

BRIEF DESCRIPTION OF THE DRAWINGS

In the drawings:

FIG. 1 is a front view of the body of a butterfly valve according to this invention with a portion thereof shown in section, FIG. 2 is a cross-sectional view taken along line 2—2 of FIG. 1, FIG. 3 is a partial cross-sectional view taken along line 3—3 of FIG. 1, FIG. 4 is a detailed view of encircled part A of FIG. 2.

DETAILED DESCRIPTION OF THE PREFERRED EMBODIMENTS

Figure 6:
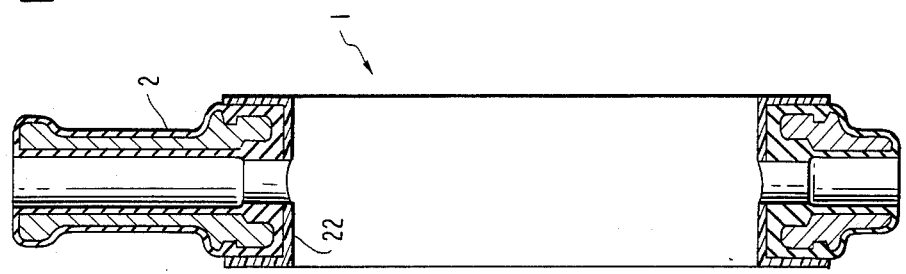
FIG. 6 is a cross-sectional view taken along line 6—6 of FIG. 5.

The butterfly valve embodiment shown in FIGS. 1 to 3 is composed essentially of a valve body 1, a butterfly (not shown) and an elastomeric coating 2.

The cast metallic body 1 has the general shape of a cylindrical ring with an X-X axis. The outside wall 3 of body 1 is cylindrical and its interior wall 4, which also has a generally cylindrical shape, is hollowed with an annular groove 5 whose profile is dovetail-shaped and whose angles may be rounded. At each end, body 1 has a generally planar surface 6 in which a shallow annular recess 7 is defined, which is attached by a rounded shoulder 8 to the cylindrical part of the wall 4. In the radially exterior part of recess 7 a circular groove or hollow 9 is provided, whose base is joined to the one hand to the planar surface 6 and on the other hand to the recess 7 by means of rounded shoulder 8. The body 1 includes two diametrically opposite extensions 10 and 11 bored with two cylindrical passages 12 and 13 which are cast or crudely machined for the control shaft and axle of the butterfly along common axis Y-Y. The two passages 12 and 13 terminate at ends which exit towards the interior of body 1 through two holes 14 which have a larger diameter than that of passages 12, 13.

The coating 2 comprises a single or continuous elastomeric (rubber-like or flexible) material which is not glued to body 1, thus eliminating surface preparation and body gluing operations and providing a greater choice of usable elastomers, certain elastomers being difficult to glue. Coating 2 can, for example, be implemented by molding it completely around body 1, which is placed as an insert in a mold.

In its median plane, where the butterfly takes support in the closed position, coating 2 has a considerably increased thickness band 15 with a spherical profile facing the interior of the valve and acting as a seat for the butterfly. This increased thickness is opposite the circular groove 5 and guarantees the precise and reliable anchoring of the coating in the zone where closing stress is concentrated, and provides excellent endurance and better resistance to aging due to the large amount or volume of the elastomer used.

At the ends of the passages 12, 13 for the control shaft of the butterfly, the coating 2 has thick collars 16 which are housed in the holes 14 of body 1, and whose ends 17, which face the interior of the valve, have the shape of spherical segments. This ensures a continuous seal between the butterfly and the band 15 which forms the valve seat. Collars 16 ensure the sealing of the control shaft passages.

The coating 2 has a reduced thickness on the outside wall 3, the planar end surfaces 6, the extensions 10 and 11 of the body, and the inside of the passages 12 and 13 for the control shaft. The recesses 7 of the end surfaces 6 are covered with a thicker layer of coating 2.

The completely coated body 1 has planar and parallel end surfaces 18 having axially projecting circular ridges 19, there being four in the example shown. The crests of these ridges project outwardly at least two millimeters, and the angle at their tops is approximately 90°. During the tightening of body 1 between the joining clamps of two adjacent pipes, the circular ridges 19 provide a labryinth type of seal, whereas hollow 9 which is filled with coating 2 defines a half-toroidal flange of elastomer 20 which provides additional sealing.

The thickened band 15 of coating material joins the coating over the lateral surfaces 6 of the body through two inclined portions 21.

The butterfly can be produced from corrosion-resistant or any other material since it is either coated with an elastomeric material, which may be identical to that covering body 1, or protected by a metallic coating or plating.

The advantages of the valve of the present invention include the following:

(a) since the metallic body 1 is molded, the shaft and axle passages 12 and 13 need be machined only roughly or left as cast;

(b) since the elastomeric coating 2 forms a continuous skin on the valve body and does not require gluing, a greater range of elastomers may be used and surface preparation prior to coating may be dispensed with;

(c) the elastomeric coating 2 surrounds all parts of the valve body, both internally and externally. This simplifies the molding problems with the coating, in particular with respect to the seal obtained between the mold and the body acting as an insert;

(d) the elimination of the need for attached seals for the butterfly shaft and axle passages, since the elastomeric collars 16 provide the necessary sealing;

(e) the coating of passages 12 and 13 acts as an integrated bearing for the shaft and axle of the butterfly;

(f) the dovetail-shaped annular groove 5 in the valve body provides excellent anchoring of the coating of the body, particularly during the cooling of the coating after its molding and during the operation of the butterfly, and also provides an optimal thickness of the elastomer at the line of working contact to ensure a long service life, particularly in the presence of hot fluids;

(g) the large mass of elastomeric coating in the groove 5 results in, during cooling after molding, a shrinkage which gives a spherical concavity to the surface of the band 15 which forms the butterfly seat, which concavity corresponds to the spherical locus produced by the butterfly edge during its movement;

(h) the elastomeric flanges 20 provide additional sealing to that provided by the ridges 19; and (i) the valve body is fully protected both internally and externally against corrosion.

As an additional alternative the butterfly body could be produced in two parts assembled along a diameter perpendicular to the axis Y-Y of the shaft passages 12, 13. The assembled body, including the fastener bolts, could be coated with an elastomeric material as described above.

Figure 5:
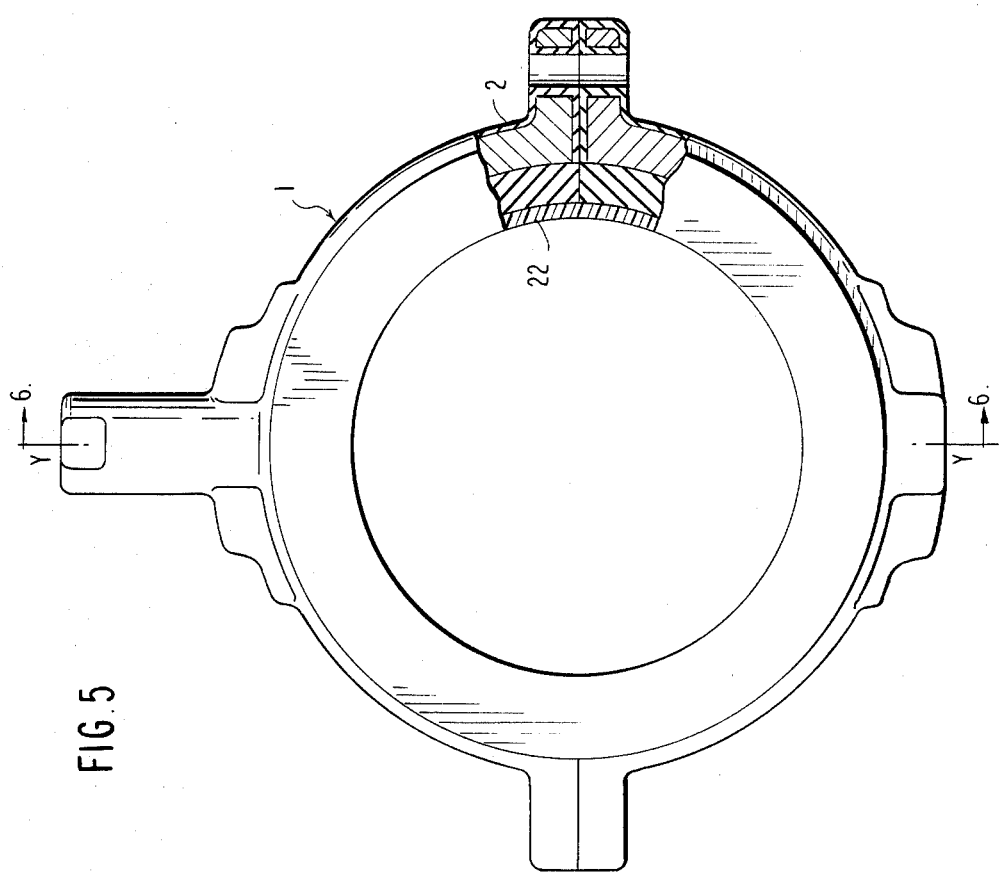
FIG. 5 is a front view, with a portion thereof shown in section, of an alternate butterfly valve according to the invention.

A further embodiment as shown in FIGS. 5 and 6 involves the production of the valve body 1 in two parts, each of which is coated separately with an elastomeric material. The two coated parts of the body are then assembled after a sleeve 22, of plastic or like material and having a generally U-shaped cross-section, is placed inside the valve body. The thickened band 15 of the elastomeric coating 2 provides sufficient compressibility and elasticity for a tight working seal between the sleeve 22 and the butterfly.

Figure 7:
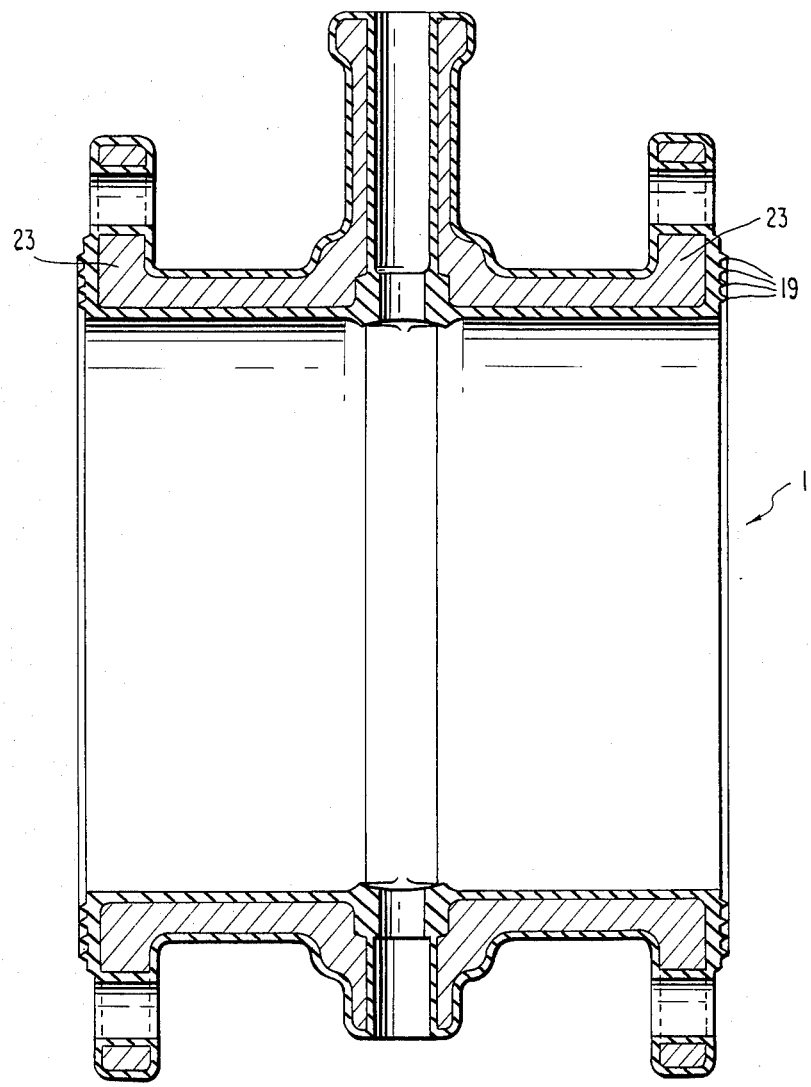
FIG. 7 is a cross-sectional view of a further alternative of the butterfly valve according to the invention.

The embodiment shown in FIG. 7 features a valve body provided with integral end clamps 23 and which is completely coated with an elastomeric (rubber-like) material. The coating of the clamps 23 has circular ridges 19 which, after tightening between the corresponding flanges of two adjacent pipes, ensures a tight labyrinth seal.

What is claimed is:

1. A butterfly valve body (1) for a butterfly valve having an axle and a control shaft, said body being annular and comprising, diametrically opposed cylindrical passages (12,13) for the axle and the control shaft, said body being completely covered on both its inside and its outside, including the passages (12,13), by a coating (2) molded on the body and made of a flexible single elastomeric material of uniform type and having the same characteristics and the same hardness at all points of the body (1), said coating forming a single continuous skin over the entire body of the valve, and said coating (2) forming thickened collars (16) in widened cylindrical bores (14) in the radially interior ends of the passages (12,13), and wherein the collars (16) have ends (17) which face the interior of the body (1) and which are spherically concave.

2. A valve body as claimed in claim 1, characterized by the fact that the coating (2), in the area where the butterfly valve rests in its closed position, has the form of a thickened band (15) which defines a valve seat for the butterfly valve, the surface of the band (15) facing the interior of the body (1) being spherically concave.

3. A butterfly valve body as claimed in claims 1 and 2, characterized by the fact that the spherical concavity of the collar ends (17) and of the thickened band (15) is obtained by shrinkage of the elastomeric material during cooling after molding thereof.

* * * * *